United States Patent [19]
Cavestri

[11] Patent Number: 6,070,454
[45] Date of Patent: *Jun. 6, 2000

[54] LEAK DETECTION ADDITIVES FOR USE IN HEATING, VENTILATING, REFRIGERATION, AND AIR CONDITIONING SYSTEMS

[75] Inventor: Richard C Cavestri, Columbus, Ohio

[73] Assignee: Bright Solutions, Inc., Troy, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/824,262

[22] Filed: Mar. 26, 1997

Related U.S. Application Data

[63] Continuation-in-part of application No. 08/505,768, Jul. 21, 1995, which is a continuation of application No. 08/700,053, Aug. 20, 1996.

[51] Int. Cl.[7] .................................................. G01M 3/20
[52] U.S. Cl. .............................. 73/40.7; 8/528; 250/302; 252/68; 252/301.16; 252/964
[58] Field of Search ................................. 73/40.5 R, 40.7; 62/77, 125; 8/526–528, 617; 252/68, 301.16, 964; 250/302, 461.1

[56] References Cited

U.S. PATENT DOCUMENTS

| | | | |
|---|---|---|---|
| 1,279,679 | 9/1918 | Fear . | |
| 1,800,693 | 4/1931 | Major . | |
| 1,915,965 | 6/1933 | Williams . | |
| 2,096,099 | 10/1937 | Gaugler | 73/40.7 |
| 2,918,893 | 12/1959 | Norton . | |
| 3,006,861 | 10/1961 | Browing et al. . | |
| 3,027,754 | 4/1962 | Alquist et al. | 73/40.7 |
| 3,071,815 | 1/1963 | MacKinnon | 8/526 |
| 3,121,615 | 2/1964 | Price . | |
| 3,234,045 | 2/1966 | Larsen | 73/40.7 |
| 3,323,350 | 6/1967 | Roberts . | |
| 3,361,547 | 1/1968 | Packo . | |
| 3,370,013 | 2/1968 | Labac | 252/964 |
| 3,476,500 | 11/1969 | Litke | 8/528 |
| 3,572,085 | 3/1971 | Packo . | |
| 3,770,640 | 11/1973 | Bartlett | 252/964 |
| 3,774,022 | 11/1973 | Dubrow et al. . | |
| 4,046,507 | 9/1977 | Zweifel et al. . | |
| 4,170,564 | 10/1979 | Brendle . | |
| 4,249,412 | 2/1981 | Townsend, III . | |
| 4,288,402 | 9/1981 | Ellis . | |
| 4,348,235 | 9/1982 | Lasswell et al. . | |
| 4,369,120 | 1/1983 | Stelz et al. . | |
| 4,382,679 | 5/1983 | Lee . | |
| 4,436,641 | 3/1984 | Stelz et al. . | |
| 4,612,798 | 9/1986 | Roberts . | |
| 4,652,395 | 3/1987 | Marcina et al. | 252/301.16 |
| 4,662,940 | 5/1987 | Monier . | |
| 4,690,689 | 9/1987 | Malcosky et al. . | |
| 4,693,118 | 9/1987 | Roberts . | |
| 4,758,366 | 7/1988 | Parekh | 252/68 |
| 4,784,959 | 11/1988 | Wegrzyn . | |
| 4,822,743 | 4/1989 | Wegrzyn . | |
| 4,862,698 | 9/1989 | Morgan et al. . | |
| 4,897,551 | 1/1990 | Gersh et al. . | |
| 4,909,806 | 3/1990 | Garbe . | |
| 4,938,063 | 7/1990 | Leighley | 73/40.7 |
| 5,071,993 | 12/1991 | Leppard et al. . | |
| 5,149,453 | 9/1992 | Parekh | 252/68 |
| 5,152,926 | 10/1992 | Brown . | |
| 5,167,140 | 12/1992 | Cooper et al. | 73/40.7 |
| 5,264,368 | 11/1993 | Clarke et al. | 73/49.2 X |
| 5,301,537 | 4/1994 | Atkinson . | |
| 5,357,782 | 10/1994 | Henry | 73/40.7 |
| 5,421,192 | 6/1995 | Henry | 73/40.7 |
| 5,440,919 | 8/1995 | Cooper | 73/40.7 |
| 5,650,563 | 7/1997 | Cooper et al. | 73/40.7 |

FOREIGN PATENT DOCUMENTS

| 1199675 | 7/1970 | United Kingdom | 8/526 |

OTHER PUBLICATIONS

Davis, "Don't Lose Your Cool Over Refrigerant Leaks", Air Conditioning, Heating & Refrigeration News, p. 10, May 2, 1994.

Davis, "Pinpointing HFC–134a Leaks is Easy if You Use the Proper Equipment", Air Conditioning, Heating & Refrigeration News, p. 36, Dec. 7, 1992.

Davis, "Pinpointing Vehicle Leaks Faster with Ultraviolet Light", Materials Evaluation 47:1248–1250, 1989.

Marrano, Fluorescent Tracer Additives as a Nondestructive Inspection Technique for Leak Testing, Materials Evaluation 51:436–438, 1993.

*Primary Examiner*—Daniel S. Larkin
*Attorney, Agent, or Firm*—Pillsbury Madison & Sutro Intellectual Property Group

[57] ABSTRACT

A leak detecting dye for use in heating, ventilating, air conditioning, or refrigeration systems employing a dye powder form of dyes such as naphthalimide, perylene, coumarin, and thioxanthane.

The dye is formulated into a useful liquid or paste mixture by mixing the dye powder (or dye in granular or crystalline form) with a solvent, a lubricant, or a refrigerant. In liquid or paste form, it is suitable for introduction into the system.

19 Claims, No Drawings

LEAK DETECTION ADDITIVES FOR USE IN HEATING, VENTILATING, REFRIGERATION, AND AIR CONDITIONING SYSTEMS

This application is a continuation-in-part of copending application(s) Ser. No. 08/505,768 filed on Jul. 21, 1995. This application is a continuation of copending application(s) Ser. No. 08/700,053 filed on Aug. 20, 1996.

BACKGROUND OF THE INVENTION

1. Field of the Invention

The present invention relates to detection of leaks in heating, ventilating, refrigeration, and air conditioning systems, and more particularly to dye products and the techniques for introducing them into such systems during their initial assembly or during servicing, permitting early detection of leaks, both initially and at some future time.

2. Background Art

A search of the background art directed to the subject matter of the present invention disclosed the following U.S. Patents:

| U.S. Pat. No. | INVENTOR | ISSUE DATE |
| --- | --- | --- |
| 2,096,099 | Gaugler | Oct 1937 |
| 3,234,045 | Larsen | Feb 1966 |
| 3,572,085 | Packo | Mar 1971 |
| 3,770,064 | Bartlett | Nov 1973 |
| 4,690,689 | Malcosky | Sep 1987 |
| 4,758,366 | Parekh | Jul 1988 |
| 5,149,453 | Parekh | Sep 1992 |
| 5,167,867 | Quaife et al | Dec 1992 |
| 5,279,967 | Bode | Jan 1994 |
| 5,357,782 | Henry | Oct 1994 |
| 5,421,192 | Henry | Jun 1995 |
| 5,440,919 | Cooper | Aug 1995 |

Based on a thorough review of the above identified patents, it is believed none of the above teach, disclose, or claim the novel combination of elements and functions found in the improved products taught by the present invention.

Fluorescent leak detection dyes to find leaks in air conditioning systems have been in use since about 1984. Such systems are taught in the above noted Parekh and Henry patents. Parekh teaches the use of perylene dyes in finding leaks in air conditioning systems that contain chlorofluorocarbon (CFC-12) refrigerant, while Henry teaches the use of naphthalimide dyes in finding leaks in both CFC-12 and hydrofluorocarbon (HFC-134a) refrigerant and HVAC systems. These patents teach the use of fluorescent leak detection after the system has left the factory and is in use in the field. In the field it is possible to charge a system by a method of dye injection using the refrigerant as a vehicle for moving the dye into the system. Various types of injectors and mist diffusers exist for this purpose.

Cooper teaches a method of testing for leaks in a refrigerated system by absorbing a predetermined amount of dye (perylene or naphthalimide) into an absorbent carrier/swatch, releasing this dye into the system, and using ultraviolet light to detect any leaks within the system. Cooper, it is noted, discloses, teaches, and claims a leak detecting additive that is implanted on and <u>absorbed</u> into a host swatch of said substrate material capable of <u>absorbing</u> and releasing a leak detection additive.

Yet another method of leak detection employed in aftermarket locations teaches the use of an electronic halogen detector. Electronic refrigerant leak detectors are presently also used in the vehicle assembly line to check for leaks in the air conditioning system. However, due to the inaccessibility of many fittings in the very limited time available to run the air conditioning system in a new automobile or truck assembly plant, and the possible existence of turbulence of air at the check site, this particular leak detection method fails to detect many leaks in the usual assembly line environment.

Thus, it can be obvious that a problem exists in the placement of suitable leak detection dyes into air conditioning systems at such time as the system or its components are assembled. If effective, filling during the assembly, enables the air conditioning system to be tested for leaks to provide a quality assurance tool prior to shipment of the system, provided sufficient time is available to operate the system. It also facilitates checking the system later in the field for leaks without the need to recharge the system with additional refrigerant and dye. Thus, this arrangement would reduce the amount of refrigerant released into the atmosphere, providing an environmental benefit.

As noted above, it is possible to utilize dye injectors and mist diffusers to place appropriate dyes in an air conditioning system. However, in the production environment, several problems exist with this arrangement. Generally speaking, such methods are usually too time consuming for production purposes as they involve hooking up and then unhooking hoses to an air conditioning system while the system is on the assembly line. Secondly, such methods can be messy if there is a spillage, which is likely to occur under time constraints present in the usual assembly line environment. It has also been determined that such methods require the flow of the refrigerant through the injector and diffuser to propel the dye into the HVAC system. Finally, such methods would require modification of the existing vehicle assembly line refrigerant charge equipment to inject dye into the vehicle air conditioning system. Accordingly, vehicle and HVAC equipment manufacturers are looking for ways to insert dyes into an HVAC system, rapidly, cleanly, and without the need for the presence of refrigerant at the time of dye insertion.

Accordingly, the methods that are going to be described hereinafter for effecting introduction of leak detection dyes into HVAC systems were not taught previously for several reasons. One of these is the fact environmental awareness was not as prevalent in society while environmental legislation was in no way as stringent as is currently the case. Such restrictions have caused vehicle and HVAC equipment manufacturers to exhibit a far greater interest in limiting the number of leaks in their vehicles so as to reduce the amounts of refrigerant released into the atmosphere. The cost of refrigerants has risen dramatically over the past few years. In the past, it was relatively inexpensive to recharge or top off an air conditioning or HVAC system. This is no longer true because chlorofluorocarbon refrigerants, such as CFC-12 are in the midst of phase-out due to their high ozone depletion potential. Accordingly, they have been replaced by more ozone friendly refrigerants, such as HFC-134a (a hydrofluorocarbon refrigerant), which cost substantially greater than the CFC-12 type refrigerants, based on costs of a few years ago. Subsequently, the CFC-12 refrigerant that is currently sold is substantially more expensive because of a federal tax imposed in conjunction with the phase-out of chlorofluorocarbons. Also, in order to prevent customer complaints which accompany the recharging of such HVAC systems with high priced refrigerants, vehicle manufacturers are doing their best to eliminate the need for recharging by reducing the number of leaks in the systems they manufacture.

It has also been found desirable to utilize a method of leak detection that does not require the air conditioning system or HVAC to be recharged prior to leak detection because the dye is already in the system from prior insertion at the time of the vehicle or HVAC equipment assembly.

Yet another reason is that automotive manufacturers currently have a much greater awareness of the necessity of providing customer satisfaction and reducing warranty costs. Manufacturers have continuously raised their standards for quality assurance and now desire to present as leak-free a system as possible to the consumer. Where such conditions are not possible, they consider it necessary to find the leak as quickly as possible once the vehicle is in the field. This desire comes not only from the automobile manufacturer, but also from the dealer networks that request that the fluorescent dye be active in the vehicle's air conditioning system when it leaves the factory.

A final reason for the utilization of this method of leak detection is the added prevalence of leaks due to the smaller molecular size of the HFC-134a refrigerant versus the previously utilized CFC-12.

Another approach to solving this particular problem involved the addition of ¼ ounce of perylene liquid dye to a desiccant bag prior to its being installed in the air conditioning system accumulator. In such an arrangement, introduction of this dye was usually too messy. Accordingly, the object of the present invention is to present satisfactory methods for inserting the dyes into an air conditioning, refrigeration, or other HVAC system at the point of manufacture.

SUMMARY OF THE INVENTION

Accordingly, it is the object of the present invention to provide an improved leak detection arrangement that facilitates the HVAC and mobile air conditioning industries to find the existence of leaks in newly assembled systems by inserting leak detection dyes into such systems or system components at the point of assembly. Insertion techniques, place and time and the properties of the dye are chosen and based on a number of different criteria and objectives, including cost, ease of insertion, cleanliness of handling, minimum insertion time, minimum of capital equipment costs, material waste, impact on the environment, shelf life prior to insertion in the system, and chemical life once introduced into the system, as well as maximum duration and strength of leak detection capability in the system. Also of importance is the rate of dye disposition into the HVAC refrigerant and lubricant combination with minimum contamination of the product prior to system insertion and maximum dye loading potentials important in the effective utilization of the teachings of the present invention.

Accordingly, the present system teaches a method of placing a leak detecting dye into a heating, ventilating, refrigeration, or air conditioning system. The system being of the type that employs a heat transfer agent, or in the alternative a refrigerant in a hermetic system chosen from the group comprising chlorofluorocarbons, hydrochlorofluorocarbons, hydrofluorocarbons and any hydrogen, halogenated or ether derivatives of methane hydrogen, halogenated ether or cyclic derivatives of ether ethane, propane, butane, pentane, hydrocarbons, carbon dioxide, and ammonia.

The dye formulation, by means of a number of methods which will be described hereinafter, is introduced into the system. The dye formulation can be placed into a container of material insoluble in the dye formulation but soluble when placed in the system. After this, the system is operated to allow the dye formulation to circulate within the system.

After the dye has been allowed to circulate within the system, system components, joints, or attachments are examined with a light source having a light emission wavelength from 190 nanometers to 600 nanometers, after which the presence of a leak can be determined by the presence of a colored visual indication, which is usually of a fluorescent nature, detectable under the light from the light source.

The dye formulation comprises at least one dye chosen from the group comprising naphthalimide, perylene, coumarin, and thioxanthane dyes. Some of these dyes are available in both liquid and powder form. In the case of the liquid dye, the formulation, which is usually liquid in consistency, may consist of a mixture of the dye along with a solvent or a combination of a solvent and a lubricant. In some instances, the liquid dye may be mixed with a binding agent of sufficiently high viscosity, or of a thixotropic nature to form a paste.

As indicated previously, the dye formulation sometimes consists of a dye powder chosen from the group including naphthalimide, perylene, coumarin, and thioxanthane dyes. It is usually quite conventional to mix the dye powder with a solvent with the end formulation assuming either liquid or paste form. Or, of course, the formulation may be a combination of a dye powder with a lubricant and a solvent. In any situation, depending upon the proportions, the dye formulation in final form may be liquid or paste.

It has also been found quite satisfactory to mix a dye powder chosen from the groups outlined above directly with a refrigerant of the types also previously outlined. This formulation, consisting of a combination of dye powder and refrigerant, after insertion into an air conditioning or refrigeration system assists in the determination of area leaks when examined with a light source having characteristics as previously described.

In certain embodiments of the present invention, the dye formulation is added to an adsorbent carrier which facilitates the introduction of the adsorbed dye on the coated carrier into the system. The carrier, which is usually of an inert substance, is able to have quantities of dye formulation adsorbed thereon, afterwards releasing certain quantities of dye into the system to facilitate finding any leaks within the system. The carrier is normally of a size and shape so as to facilitate dissolution and its introduction into the system.

In at least one embodiment of the present invention, the dye coated carriers are adapted for inclusion into a desiccant bag, receiver drier, filter drier, or accumulator of the heating, ventilating, refrigeration, or air conditioning system.

In at least one embodiment of the present invention, the formulation including dye powder is formulated into a unitary structure which then may be introduced into the system. This unitary structure may be compacted or mixed with a binding agent so as to be formed into the unitary structure under pressure or in the presence of heat or cold. The unitary structure is compacted a predetermined amount to facilitate dissolution and subsequent release into the system. While the structure may be shaped into such shapes as spheres, discs, and similar surfaces which may have enhanced surfaces consisting of grooves, openings, etc., to facilitate maximum flow through, around or over the unitary structure when placed within the system.

In another embodiment of the present invention, the dye formulation consists of a dye powder, which may be formed into tiny dye beads or cylinders with a suitable binding agent. Assumption of the shape of beads takes place by tumbling, or in the alternative rolling, so as to force the powder into a spherical shape. The dye beads are of a predetermined size that facilitates their dispersion into solution in the system refrigerant, or in a combination of the system refrigerant and a lubricant.

It has also been found that in some situations the dye formulation has been possible to be caused to adhere to desiccant beads which when the dry formulation is mixed with the desiccant beads causes a dry coating to be affixed to the desiccant beads after which the desiccant coated dry beads may be inserted into a desiccant bag, receiver drier, accumulator, or filter drier for insertion subsequently into the system.

It has also been found possible to add a liquid dye from the usual group of naphthalimide, perylene, coumarin, and thioxanthane with desiccant beads to again result in a dry coating rendering the beads quite useful for insertion into a desiccant bag or other components and subsequently into the system for detection of leaks at such time as a light source having a light emission wavelength from 190 nanometers to 600 nanometers is directed at the system.

While the usage of dye in bead form appears to be highly desirable for insertion into desiccant bags, it is also possible to employ techniques for introducing the dye in powder or liquid form directly into the desiccant bags for insertion subsequently into the system.

DETAILED DESCRIPTION OF THE PREFERRED EMBODIMENTS

A best understanding of the present invention will be had by making reference to the following description, wherein will be described the method of placing a leak detecting dye in a heating, ventilating, refrigeration, or air conditioning system by preparing a dye formulation. Various means are taught for adapting the dye formulation for introduction into the system, as well as various techniques for introducing the dye formulation into the system, followed by examination of the system with a light source to determine the presence of a leak resulting from the presence of the dye formulation at leak sites.

Initially, in preparing the dye formulation, a dye is chosen from the group comprising naphthalimide, perylene, coumarin, and thioxanthane dyes. Some of these dyes are available in both liquid and powder form, both of which are adaptable for preparation into a formulation for utilization in accordance with the teachings of the present invention.

When utilizing the dye powder, several techniques are available for preparing it into a formulation which is usable in accordance with the present invention. The first of these consists of taking the dye powder and forming it into a granular form such as beads or pellets. It should be understood that hereinafter when the term dye powder is used it shall refer equally to dye in granular or crystalline form.

Accordingly, it has also been found useful to mix the dye powder with desiccant beads, or even crushed granules of desiccant material, which results in the addition of a dry coating onto the desiccant beads or granules. An effective manner of utilization of the desiccant coated dry beads is to insert them into a desiccant bag, receiver drier, accumulator, or filter drier, which subsequently is inserted then into the system.

Rather than introducing the dye formulation into the system by means of beads or desiccant coated beads located within a desiccant bag or filter drier, it has also been found possible to take the dye powder chosen from the group, outlined above, and formulate the dye into a solid or semi-solid unitary structure. This structure may take the form of a pellet, bullet, briquette, disc, or similar unitary structure.

Yet another technique for introducing the dye formulation into the system consists of mixing the dye powder directly into the refrigerant chosen from the group comprising chlorofluorocarbons, hydrochlorofluorocarbons, hydrofluorocarbons, or various hydrogenated or other derivatives of methane, halogenated ether or cyclic derivatives of ether ethane, propane, butane, pentane, hydrocarbons, carbon dioxide, and ammonia. It has been found effective to add initially a refrigerant prepared as a formulation with the dye powder, so that leaks may be rapidly detected under examination from a light source having characteristics previously described and also described hereinafter.

A very effective means for introducing the dye formulation into the system consists of preparing the dye formulation by means of mixing liquid or dry dye chosen from the group, outlined above, and preparing an adsorbent carrier which will be coated with the dye formulation.

A number of different techniques are available for preparing the dye formulation for use in the present method of placing a leak detecting dye in the heating, ventilating, refrigeration, or air conditioning system in accordance with the teachings of the present invention. In some systems where an adsorbent carrier is effectively utilized, the dye formulation useful for coating the adsorbent carrier with the dye formulation may be prepared by choosing a dye powder from the group, outlined above.

The dye powder is then mixed with a solvent, such as mineral oil, synthetic lubricants, etc., producing a dye formulation in liquid form, or in the alternative in the form of a paste, both of which can be effectively coated into an adsorbent carrier. It should be noted that the solvent utilized in this mixture with the dye powder can be either polar or non-polar in nature and can be an organic or inorganic compound.

It is also possible to prepare a dye formulation by selection of the dye powder from the dyes noted above, and mixing the dye powder with a lubricant and a solvent to form a liquid, or in the alternative a paste formulation. Effective lubricants for this purpose may be chosen from the group of hydrocarbons which include mineral oils, synthetic hydrocarbons, alkylbenzenes, polyalphaolefins, synthetic polyalkylene glycols that are terminated as mono- or diethers or as esters, and the general class of polyolester lubricants of di-, tri-, tetra- or polyfunctional pentaerythritol esters, as well as linear mono, di- and tricarboxylic acids or alcohols.

Again, the solvent incorporated within the formulation may be polar or non-polar in nature, and can be an organic or inorganic compound, while the lubricant may be chosen from the group, outlined above.

When the dye formulation prepared as outlined above is coated onto an adsorbent carrier, and then introduced into the heating, ventilating, refrigeration, or air conditioning system, the system is then allowed to operate to permit the dye formulation to circulate within the system. After the above has taken place, the system may be examined with a light source having a light emission wavelength from 190 nanometers to 600 nanometers directed at the system determining the presence of a leak by a colored visual indication detectable under light from the light source.

Other techniques for introducing the dye formulation as outlined above include the direct insertion of the formulation into system components by means of volumetric insertion means, such as an auger, or nozzle. Weight measurement means can also effectively be utilized by premeasuring specific amounts of formulation, which can then be dispensed through a slide gate, trap door or similar arrangement.

Yet another approach would be to insert a certain amount of formulation into a porous bag, similar in many respects to a tea bag, inserting the bag into appropriate components of the system.

Finally it is possible to also mix the dye powder chosen from the group indicated above to be mixed with a binding agent, such as mineral oil, synthetic lubricants, etc., of a sufficiently high viscosity, or a sufficiently thixotropic nature to form a paste. It is required, however, that the binding agent be of a viscosity to facilitate dissolution of the dye formulation into the heating, ventilating, refrigeration, or air conditioning system during system operation. The paste so formed may be applied manually or mechanically to components of the system, such as a desiccant bag, a receiver drier, a filter drier, an accumulator, the solid core of a filter drier, or any coatable surface.

Another method of preparing dye formulation is the utilization of a liquid dye chosen from the group, outlined above. The intent of the dye formulation, of course, is to be introduced onto an adsorbent carrier.

In the foregoing, we have described a number of methods for preparing dye formulations from dye powder or liquid dye, and introducing dye by various means into heating, ventilating, refrigeration, or air conditioning systems which employ a heat transfer agent, or in the alternative a refrigerant in a hermetic system chosen from the group comprising chlorofluorocarbons, hydrochlorofluorocarbons, hydrofluorocarbons, or any hydrogenated or other derivatives of methane, halogenated ether or cyclic derivatives of ether ethane, propane, butane, pentane, hydrocarbons, carbon dioxide and ammonia.

When the dye has been introduced into the system, and the system operated, examination of the system under a light source having light emission wavelength from 190 nanometers to 600 nanometers directed at the system can effectively determine the presence of any leaks by a colored visual indication detectable under the light from the light source.

While but several embodiments of the present invention have been shown, it will be obvious to those skilled in the art that numerous modifications may be made without departing from the spirit of the invention, which shall be limited only by the scope of the claims appended hereto.

What is claimed is:

1. A method of placing a leak detecting dye in a heating, ventilating, air conditioning, or refrigeration system, the method comprising the steps of:

preparing a dye formulation comprising a thioxanthane dye, said dye formulation being a paste;

introducing said dye formulation into said system; and operating said system to allow said dye formulation to circulate within said system.

2. The method as claimed in claim 1 wherein:

said dye formulation further comprises a lubricant, said solvent and said lubricant suitable for dissipating said dye powder; said lubricant chosen from a group of hydrocarbons, including mineral oils, synthetic hydrocarbons, alkylbenzenes, polyalphaolefins, synthetic polyalkylene glycols that are terminated as mono or diethers or as esters and the general class of polyolester lubricants in di-, tri-, tetra- or polyfunctional pentaerythritol esters, as well as linear mono, di-, and tricarboxylic acids or alcohols.

3. The method as claimed in claim 1 wherein:

said dye formulation including said dye powder is added to a refrigerant chosen from the group comprising chlorofluorocarbons, hydrochlorofluorocarbons, hydrofluorocarbons and any hydrogen, halogenated or other derivatives of methane, halogenated ether, or cyclic derivatives of ether ethane, propane, butane, pentane, hydrocarbons, carbon dioxide, and ammonia.

4. The method as claimed in claim 1 wherein:

said dye formulation is introduced into said system by volumetric insertion means into a desiccant bag or in the alternative into a system component.

5. The method as claimed in claim 1 wherein:

said dye formulation is introduced into said system by an auger.

6. The method as claimed in claim 1 wherein:

said dye formulation is introduced into said system by weight measurement means.

7. The method as claimed in claim 6 wherein:

said dye formulation is placed into a porous bag facilitating the flow of refrigerant through said bag when said bag is inserted into a component of said system.

8. The method as claimed in claim 1 wherein:

said paste is applied manually, or in the alternative mechanically to a surface of a component of said system.

9. A method of placing a leak detecting dye in a heating, ventilating, air conditioning, or refrigeration system, the method comprising the steps of:

preparing a dye formulation comprising a thioxanthane dye and a solvent, said dye formulation being a liquid or a paste;

introducing said dye formulation into said system; and operating said system to allow said dye formulation to circulate within said system.

10. The method as claimed in claim 9 wherein:

said solvent is a polar inorganic compound.

11. The method as claimed in claim 9 wherein:

said solvent is a non-polar organic compound.

12. The method as claimed in claim 9 wherein:

said solvent is a non-polar inorganic compound.

13. The method as claimed in claim 9 wherein:

said dye formulation further comprises a lubricant suitable for dissipating said dye powder; said lubricant being chosen from a group of hydrocarbons, including mineral oils, synthetic hydrocarbons, alkylbenzenes, polyalphaolefins, synthetic polyalkylene glycols that are terminated as mono or diethers or as esters and the general class of polyolester lubricants in di-, tri-, tetra-, or polyfunctional pentaerythritol esters, as well as linear mono, di-, and tricarboxylic acids or alcohols.

14. The method as claimed in claim 9 wherein:

said dye formulation including said dye powder is added to a refrigerant chosen from the group comprising chlorofluorocarbons, hydrochlorofluorocarbons, hydrofluorocarbons and any hydrogen, halogenated or other derivatives of methane, halogenated ether, or cyclic derivatives of ether ethane, propane, butane, pentane, hydrocarbons, carbon dioxide, and ammonia.

15. The method as claimed in claim 9 wherein:

said dye formulation is introduced into said system by volumetric insertion means into a desiccant bag or in the alternative into a system component.

16. The method as claimed in claim 9 wherein:

said dye formulation is introduced into said system by an auger.

17. The method as claimed in claim 9 wherein:

said dye formulation is introduced into said system by weight measurement means.

18. The method as claimed in claim 9 wherein:

said dye formulation is placed into a porous bag facilitating the flow of refrigerant through said bag when said bag is inserted into a component of said system.

19. The method as claimed in claim 9 wherein:

said paste is applied manually, or in the alternative mechanically to a surface of a component of said system.

* * * * *